United States Patent
Cooney

(10) Patent No.: US 7,647,809 B1
(45) Date of Patent: Jan. 19, 2010

(54) APPROACH FOR INDICATING THE OCCURRENCE OF A MECHANICAL IMPACT ON A MATERIAL, SUCH AS A LOW-DUCTILITY COMPOSITE MATERIAL

(75) Inventor: Daniel E. Cooney, Tehachapi, CA (US)

(73) Assignee: Spectrum Aeronautical, LLC, Carlsbad, CA (US)

(*) Notice: Subject to any disclaimer, the term of this patent is extended or adjusted under 35 U.S.C. 154(b) by 0 days.

(21) Appl. No.: 10/799,308

(22) Filed: Mar. 13, 2004

(51) Int. Cl.
  *G01N 3/30* (2006.01)
(52) U.S. Cl. .................................. 73/12.01
(58) Field of Classification Search ............. 73/760, 73/12.01, 12.08, 783; 428/610; 503/214, 503/201, 206, 209, 227; 442/205; 283/95
See application file for complete search history.

(56) References Cited

U.S. PATENT DOCUMENTS

| | | | |
|---|---|---|---|
| 2,712,507 A | | 7/1955 | Green |
| 3,020,178 A | * | 2/1962 | Sweeney et. al. ............ 162/146 |
| 3,438,914 A | * | 4/1969 | Krockenberger ............ 523/204 |
| 3,452,861 A | * | 7/1969 | Erwin ...................... 206/389 |
| 3,505,244 A | | 4/1970 | Cessna |
| 3,652,225 A | | 3/1972 | Coffin, Jr. |
| 3,803,485 A | | 4/1974 | Crites et al. |
| 3,906,123 A | * | 9/1975 | Vincent et al. ............. 503/214 |
| 4,003,245 A | | 1/1977 | Ogata et al. |
| 4,010,311 A | * | 3/1977 | Lewis et al. ................ 428/412 |
| RE30,116 E | * | 10/1979 | Maalouf .................... 503/204 |
| 4,197,346 A | * | 4/1980 | Stevens ..................... 503/212 |
| 4,198,446 A | | 4/1980 | Goetz |
| 4,618,529 A | * | 10/1986 | Yamamura et al. .......... 442/205 |
| 4,917,938 A | | 4/1990 | Mohan |
| 4,924,182 A | * | 5/1990 | Vernon et al. .............. 324/237 |
| 4,963,457 A | | 10/1990 | Matsushita et al. |
| 5,250,492 A | * | 10/1993 | Dotson et al. .............. 503/201 |

(Continued)

OTHER PUBLICATIONS

H. Razi et al., "Principles for Achieving Damage Tolerant Primary Composite Aircraft Structures", *11th DoD/FAA/NASA Conf. on Fibrous Composites in Structural Design*, Fort Worth, TX, Aug. 1996, 11 pages.

(Continued)

*Primary Examiner*—Lisa M Caputo
*Assistant Examiner*—Octavia Davis
(74) *Attorney, Agent, or Firm*—Nydegger & Associates

(57) ABSTRACT

A method of indicating the presence of mechanical impact is used with a low-ductility material, such as a composite material, having a tensile elongation to failure of less than about 2 percent. The method includes preparing an indicator paint having an impact-sensitive component that produces a visible change when subjected to a mechanical impact, applying the indicator paint to the surface of the low-ductility material, placing the low-ductility material having the indicator paint thereon into circumstances where it may be subject to the mechanical impact, and thereafter inspecting the low-ductility material having the indicator paint thereon for the presence of the visible change. The method may be used to establish design criteria for the low-ductility material by establishing an impact-effect threshold value from the step of inspecting, and determining a design limit for the low-ductility material responsive to the impact-effect threshold value. One result of the using the present approach is to reduce the structural weight by reducing the barely visible impact damage design factor.

16 Claims, 2 Drawing Sheets

U.S. PATENT DOCUMENTS

| | | | | |
|---|---|---|---|---|
| 5,254,473 | A | * | 10/1993 | Patel .............................. 436/1 |
| 5,401,060 | A | * | 3/1995 | Chang et al. .................. 283/95 |
| 5,488,017 | A | * | 1/1996 | Szweda et al. ............. 501/95.2 |
| 5,494,472 | A | | 2/1996 | Levy et al. |
| 5,534,289 | A | | 7/1996 | Bilder et al. |
| 5,593,772 | A | * | 1/1997 | Zamot ........................ 428/323 |
| 5,597,361 | A | | 1/1997 | Hope |
| 5,605,873 | A | * | 2/1997 | Chang ........................ 503/201 |
| 5,616,865 | A | * | 4/1997 | Webster ....................... 73/627 |
| 5,846,901 | A | | 12/1998 | Jubran |
| 5,876,266 | A | * | 3/1999 | Miller et al. .................. 451/36 |
| 5,905,260 | A | | 5/1999 | Sage et al. |
| 5,920,017 | A | * | 7/1999 | Pechersky .................... 73/762 |
| 6,159,394 | A | | 12/2000 | Akiyama et al. |
| 6,162,485 | A | * | 12/2000 | Chang ............................ 427/1 |
| 6,452,873 | B1 | * | 9/2002 | Holt et al. .................... 368/327 |
| 6,495,833 | B1 | * | 12/2002 | Alfano et al. ............. 250/341.8 |
| 6,514,909 | B1 | | 2/2003 | Austin et al. |
| 6,528,190 | B1 | * | 3/2003 | Campbell et al. ........... 428/701 |
| 6,581,474 | B2 | | 6/2003 | Goods et al. |
| 6,655,218 | B1 | * | 12/2003 | Ogisu et al. ................... 73/768 |
| 6,668,661 | B2 | * | 12/2003 | Rider ........................... 73/762 |
| RE39,044 | E | * | 3/2006 | Ross ........................... 427/152 |
| 7,434,480 | B2 | * | 10/2008 | Georgeson et al. ..... 73/862.041 |

OTHER PUBLICATIONS

I Sage et al., "Triboluminescent damage sensors," Abstract of publication in *Smart Mater.Struct.* vol. 8 (Aug. 1999), pp. 504-510, 1 page Abstract.

Zhiping Zheng et al., "A triboluminescent europium (III) complex", *Acta Cryst.*, vol. C58, pp. m50-m52 (2002).

Appleton Co., "Carbonless Copy Paper Background", download from internet web site http://www.carbonlesssafety.com/background.htm, Mar. 8, 2004, 4 pages.

* cited by examiner

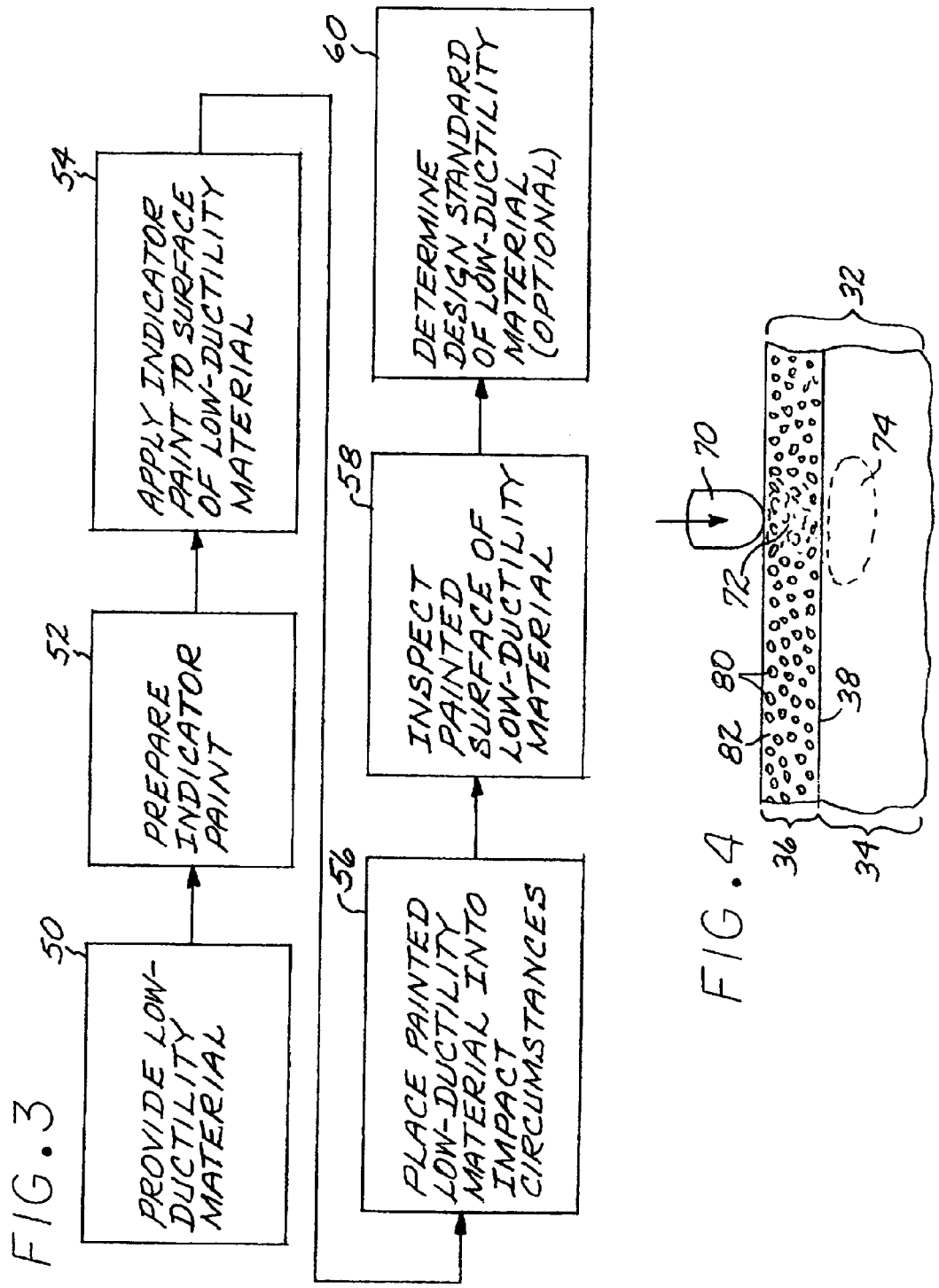

US 7,647,809 B1

APPROACH FOR INDICATING THE OCCURRENCE OF A MECHANICAL IMPACT ON A MATERIAL, SUCH AS A LOW-DUCTILITY COMPOSITE MATERIAL

This invention relates to the detection of mechanical impacts on a material and to the utilization of the mechanical impact information in establishing design standards for use of the material.

BACKGROUND OF THE INVENTION

The widespread adoption of composite materials in aircraft structures has led to significant performance improvements. The composite material incorporates two or more component materials, each of which retains its individual identity, as phases into a single composite material. The resulting composite material is engineered to realize the most-advantageous properties of the various component materials, while minimizing or avoiding their disadvantageous properties.

In a typical case, strong fibers are embedded in a polymeric matrix. An example of such a composite material includes carbon or graphite fibers embedded in a polymer matrix such as an epoxy. The high strength and modulus of the fibers are incorporated into the composite material. These materials exhibit much higher stiffness-to-weight and strength-to-weight ratios than do conventional metallic materials.

However, many of the composite materials and other low-ductility materials exhibit a low resistance to mechanical impact damage. If, for example, a tool is dropped on a panel of the composite material or a stone is kicked up and impacts the composite panel during takeoff or landing, the resulting damage may serve as a failure-initiation site. That is, local damage at the initial impact site may propagate and lead to premature failure of the composite material. The occurrence of mechanical impact strikes may be difficult to identify in many cases, because they are not visible to the unaided eye even though damage may have occurred below the surface of the composite material. Mechanical impact damage is less of a concern for conventional metallic materials that typically have higher ductilities than do the composite materials, although it is a problem. Such metallic materials inelastically deform and readily indicate mechanical impacts, as for example by dents in the surface.

In recognition of the potential for mechanical impact damage of the composite materials, testing and design standards are imposed on composite material structures beyond those required for metallic structures. One part of these standards is a damage-tolerance factor, sometimes termed a "knockdown factor" or a "barely visible impact damage (BVID) factor" in the industry, by which performance values of the composite materials are reduced for the purpose of establishing allowable design standards. The damage-tolerance factor reduces the allowable mechanical property values (i.e., stiffness, strength) to which the composite material may be designed in light of the potential for undetectable mechanical impact and other types of difficult-to-detect damage. The use of the damage-tolerance factor thus reduces the weight advantage that the composite materials otherwise enjoy. As a result of the application of the damage-tolerance factor, the composite material components must be made heavier than would otherwise be the case, so that the components are certain to retain their required strength even after mechanical impact damage has occurred.

There is a need for an improved approach to the problem of mechanical impact damage in composite materials and other low-ductility materials, including both indicating the presence of such damage and also in the setting of design standards. The present invention fulfills this need, and further provides related advantages.

SUMMARY OF THE INVENTION

The present invention provides a technique for indicating the presence of mechanical impact on a material, and for using that indicating capability in establishing design limits for the use of the materials. The approach is operable for materials generally, but is most advantageously used in relation to low-ductility materials such as composite materials and ceramics. The indicating approach is passive in nature, and does not require the presence of real-time instrumentation in order to register and record the mechanical impact. The mechanical impact indication is preserved for subsequent evaluation without the use of instrumentation. Inspections may be conducted visually, with the unaided eye or with relatively simple inspection apparatus that is not incorporated into the structure being monitored. The method is sensitive to low levels of mechanical impact, even below levels that are normally considered to be damaging. Those concerned with mechanical impacts can therefore be confident that the presence of mechanical impacts may be reliably discerned.

In accordance with the invention, a method of indicating and utilizing the presence of mechanical impact on a material comprises providing the material having a surface. The material may be of any type, but is preferably a low-ductility material having a tensile elongation to failure of less than about 2 percent. Such a low-ductility material is typically a composite material, such as a polymer-matrix composite material, or a ceramic material.

An indicator paint (which may also be termed an "indicator coating") is prepared having an impact-sensitive component that produces a visible persistent change when subjected to a mechanical impact. The visible change is preferably a color change or a mechanical change to the surface (e.g., a rumpling of the surface of the paint) that is visible in the visible spectrum, but it may be of other types such as heat emission (visible in the infrared). The indicator paint typically includes a first reactant and a second reactant. The first reactant and the second reactant may be separated by a barrier that is ruptured when the indicator paint is subjected to the impact. This structure of the indicator paint may typically be implemented by encapsulating one (or both) of the reactants to provide the rupturable barrier.

A strongly preferred feature of the indicator paint is that the visible persistent change is a semi-permanent change that persists for at least 24 hours and more preferably for at least 72 hours, or most preferably persists essentially permanently. This persistence of the visible change is to be contrasted with other approaches in which the indicator paint emits a flash of light briefly when subjected to the mechanical impact. The intensity of the light falls rapidly and does not produce a semi-permanent or permanent visible change. This latter light-emission approach requires the presence of instrumentation to record the light emission at the time the impact occurs. In the present approach, light emission may occur incidentally, but the semi-permanent or permanent visible persistent change must be present.

The indicator paint is applied to the surface of the low-ductility material. The low-ductility material having the indicator paint thereon is placed into circumstances where it may be subject to the mechanical impact. These circumstances may occur, for example, during manufacture, testing, or service of the article made of the low-ductility material. As noted, it is strongly preferred that the low-ductility material having the paint thereon is not instrumented with light-detection instrumentation during this step of placing.

The low-ductility material having the indicator paint thereon is thereafter inspected for the presence of the visible change associated with the occurrence of an impact. The initial inspection may initially be performed by the unaided eye in most cases. Subsequent inspection with optical instruments, X-rays, and/or acoustic sensors or the like may be employed to yield more-detailed information about the nature and severity of the mechanical impact first visualized with the indicator paint.

The present approach is also extended to an article. An article comprises a substrate having a surface, and a paint applied to the surface of the article. The paint comprises a plurality of microcapsules that, when ruptured, produce a color change. Preferably, each microcapsule comprises a first reactant. The microcapsules are embedded in a paint matrix comprising a paint binder and a second reactant. The first reactant and the second reactant produce a color in the paint when the microcapsules are ruptured and the first reactant and the second reactant are mixed together and chemically reacted to produce a colored reaction product. The colored reaction product has a color different from those of the paint, the first reactant, the microcapsules, and the second reactant, so that the colored reaction product has a well-defined visual contrast with the paint, the first reactant, the microcapsules, and the second reactant.

The present approach may be used to set design standards and limits for the low-ductility material. In this approach, a design limit is established for the low-ductility material responsive to the observability of impacts. More specifically, a method for establishing a design standard for a low-ductility material comprises the steps of setting a first design standard for a low-ductility material having an indicator paint applied thereto, wherein the indicator paint has an impact-sensitive component that produces a visible change when subjected to a mechanical impact, and setting a second design standard for the low-ductility material which does not have the indicator paint applied thereto. Indicator paints as described herein may be used in this method. Preferably, the second design standard has a damage-tolerance factor that is greater than the damage-tolerance factor of the first design standard. Most preferably, the first design standard has a unity (i.e., 1.0) damage-tolerance factor, and the second design standard has a damage-tolerance standard greater than 1.

The present approach thus provides a reliable approach for indicating the presence of a mechanical impact on the material such as the low-ductility material. The occurrence of such a mechanical impact may be readily detected visually, for example during a manufacturing operation, a periodic internal inspection by mechanics, or a pre-flight walk-around examination of the aircraft. Further investigation of any colored area (or other visual indicator) that is seen is thereafter performed as needed. Repair or corrective measures may then be taken as appropriate. The information gained from this approach may also be used in setting the design limits for the use of the low-ductility material. The information gained may also be used to improve inspection techniques by, for example, indicating impacted areas that need greater scrutiny during quality control inspection.

The present use of a paint-based indicator approach has many advantages. Paints are widely used and are familiar, so that the adoption of the present technique does not require that users accept a radically different approach than what is familiar. Paint technologies to ensure good adhesion of the paint to a surface, resistance to changes over time such as weathering, discoloration of the paint over time, good mechanical properties of the paint, surface smoothness of the paint, and the like are well established for other applications. The indicator paint, once applied, may remain in place for an extended period of time to protect the surface of the material in a manner like that of a conventional protective paint. The indicator paint functions in a passive manner in that the visual indicator only appears when impact occurs. Special instrumentation is not required to see the visual indication of the impact. A large area of the painted surface may be quickly scanned by eye to search for any possible visual indications, such as color changes, associated with the occurrence of an impact. There is a wide selection of types of visual indicator materials, such as many types of color producers that may be furnished in encapsulated form. The reactants that produce the visible change are enclosed within the paint, which protects them from weathering and other degradation. The amount of pigment in the indicator paint may be optimized for a combination of paint functionality and visibility of the impact indication.

Other features and advantages of the present invention will be apparent from the following more detailed description of the preferred embodiment, taken in conjunction with the accompanying drawings, which illustrate, by way of example, the principles of the invention. The scope of the invention is not, however, limited to this preferred embodiment.

BRIEF DESCRIPTION OF THE DRAWINGS

FIG. 3 is a block diagram of an approach for practicing an embodiment of the present approach; and FIG. 4 is a fragmentary enlarged detail of FIG. 2, showing the effect of an impact on the paint and on the underlying low-ductility material.

DETAILED DESCRIPTION OF THE INVENTION

Figure 1:
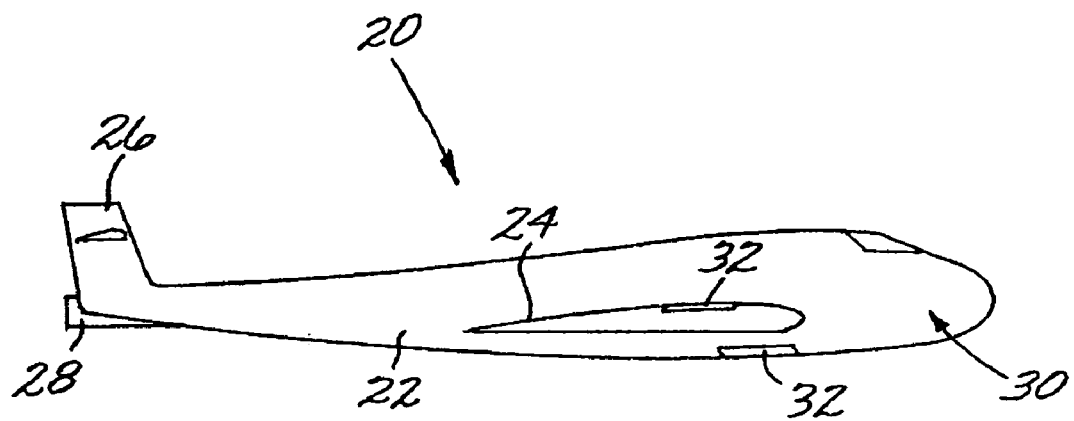
FIG. 1 is a side elevational view of an aircraft.

FIG. 1 depicts an aircraft 20 having a fuselage 22, a wing 24 attached to the fuselage 22, a tail 26 attached to the fuselage 22, and an engine 28 within the fuselage 22 (or which may be supported externally from some part of the fuselage 22, the wing 24, or the tail 26). Portions of an external surface 30 of the fuselage 22, the wing 24, or the tail 26 may be made of pieces, termed "panels" 32 herein, of a material such as a low-ductility material, two of which panels are shown by way of example. Other portions of the aircraft 20, such as internal structure not visible in FIG. 1, may also be made of the low-ductility material. The preferred application of the present approach is in relation to such a low-ductility material. The remainder of the discussion will focus on the use with the low-ductility material, with the understanding that the present approach is applicable to higher-ductility materials as well.

Figure 2:
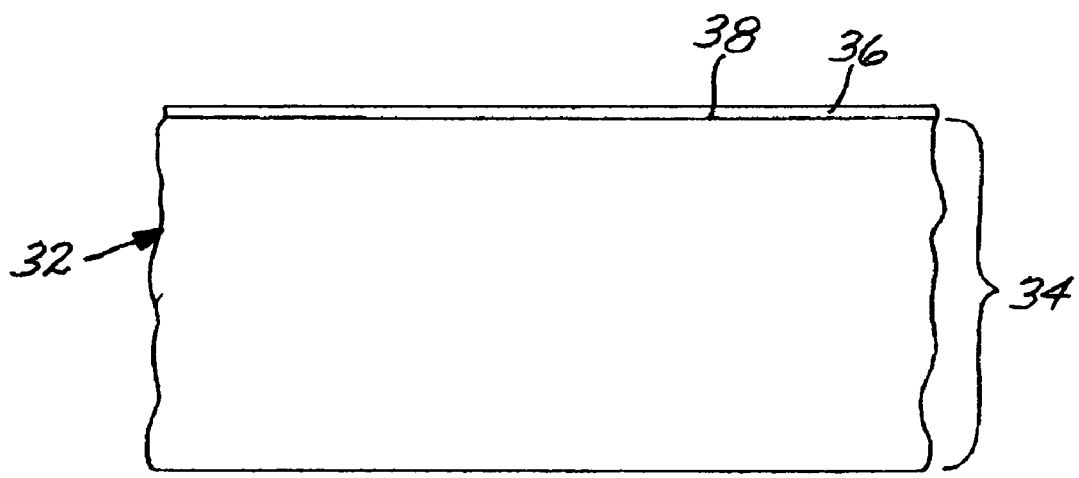
FIG. 2 is an enlarged schematic side-sectional view of a panel taken from the aircraft.

FIG. 2 illustrates a portion of one of the panels 32 made of the low-ductility material 34. A layer of an indicator paint 36 is applied to a surface 38 of the panel 32. ("Paint" and "coating" mean the same thing as used herein.) The layer of the indicator paint 36 indicates the presence of mechanical impacts on the layer 36, and thereby on the low-ductility material 34 of the panel 32, in a manner to be discussed subsequently.

FIG. 3 depicts a preferred approach for practicing an embodiment of the present invention. A piece of a low-ductility material is provided, step 50, such as the panel 32 prior to painting. The low-ductility material has a tensile elongation to failure of less than about 2 percent, and preferably less than 2 percent. Materials with greater elongations to failure, such as most metals, do not have as much need for the use of the indicator paint, as they have sufficient non-elastic deformability to evidence impacts by other visible mechanisms, such as dents, but the present approach is operable with such higher-ductility materials. Examples of low-ductility materials include composite materials such as a polymer-matrix (i.e., organic matrix), nonmetallic, composite material, and ceramics. An example of the polymer-matrix composite material is a graphite fiber-epoxy matrix composite material. Other materials with which the present impact-indicating approach may be used include, for example, wood, plastics, paper products, glass, semiconductors, and the like. The results of the use of the impact-indicating approach may be used to infer other impact-related events, such as potential damage to the contents of a container made of the material to which the impact-indicating paint is applied.

An indicator paint is prepared, step 52. The indicator paint has an impact-sensitive component that produces a visible change when subjected to a mechanical impact. The preferred type of visible change is a color change. The color change is readily detected with the unaided eye, and/or by using various instruments. This visible change is preferably viewed in the visible-light wavelength range, but it may be a visible change that is visible in other ranges such as heat emissions visible in the infrared range.

The indicator paint has two primary components, a paint base and an indicator component. The paint base may be of any type, and many paints are known for other uses. The paint is preferably prepared in a flowable or sprayable liquid form, applied to the surface to be painted, and then dried and cured to form a solid paint layer. The paint base typically includes a pigment, a binder, and a carrier. The pigment, which may be omitted if desired but is preferably present, is small particles that have a selected initial color and impart that initial color to the paint. That initial color is imparted to the paint layer 36 prior to any impact. A wide variety of pigments of different colors is known in the art. The binder is a constituent that binds the pigment particles together when the paint is cured. A wide variety of binders, including both aqueous-based binders and non-aqueous-based binder, and including both organic and inorganic binders, are known in the art. Usually, the more pigment that is present in the solid paint, the greater is its opacity or hiding power. The amount of pigment used in the present approach may be adjusted as desired to allow more or less of the color (or other visible change) produced by the indicator component to be viewed. The carrier is a constituent that adjusts the fluidity of the paint and is usually selected according to the technique that is used to apply the paint to a surface. The more carrier that is present, the more fluid is the paint. Common carriers are oils and water. In the usual case, there is initially sufficient carrier that the paint is a flowable slurry. The carrier typically evaporates after the paint is applied onto the surface and as the binder in the paint cures and hardens to form a solid layer. A wide variety of binders, binders, and carriers are known in the art. There are no known limitations on the type of paint base that may be used, other than the limitation that the paint base may not react with the indicator component to prevent its operation.

The indicator component mixed into the paint base may be of any operable type that produces a visible change. The preferred approach is to provide a first reactant, and a second reactant. The first reactant and the second reactant are separated by a barrier that is ruptured when the indicator paint layer 36 is subjected to the impact. For example, the first reactant may be placed into a plurality of rupturable microcapsules, and the second reactant may be mixed with the paint binder or placed into a second plurality of rupturable microcapsules.

Numerous first reactant/second reactant combinations that produce color changes in the visible wavelength range when reacted together are known in the art for other purposes such as pressure-sensitive layered papers, and these combinations may be adapted for use in the present approach. See for example, U.S. Pat. Nos. 4,003,245 and 5,846,901, whose disclosures are incorporated by reference in its entirety. A preferred first reactant/second reactant combination is a Lewis acid/base pair, wherein one of the pair is encapsulated and the other of the pair is mixed with the paint binder. When the cured solid paint layer 36 is subjected to an impact, the microcapsules in the area under the impact are ruptured, the first reactant is released to mix with the second reactant, and the reaction occurs to produce a color change. The reactant pair must be selected so that the reaction product is of a desired color. Such reactants are available commercially from the Appleton Company, Appleton, Wis. and from other suppliers.

Other techniques may be used for the indicator component of the paint. Pressure-sensitive liquid crystal materials that change their color upon application of a pressure may be used as long as the color is persistent, see for example U.S. Pat. No. 5,597,361, whose disclosure is incorporated by reference in its entirety. The indicator component may instead be a microcapsule containing a dye that is released when the microcapsule is ruptured, see for example U.S. Pat. No. 5,494,472, whose disclosure is incorporated by reference in its entirety.

The present approach is compatible with a wide range of improvements and modifications that are available for these indicator approaches. For example, different colors or other combinations of visible effects may be produced using different reactant combinations. The strength of the rupturable barrier (e.g., the microcapsule walls) and the size of the microcapsules may be controlled so that the appearance of the visible change may be a function of the intensity of the impact. Techniques for controlling the microcapsules are known in the art for other purposes. Combining these two modifications, the color that appears may be linked to the intensity of the impact, so that the severity of the impact may be assessed.

The visible change is preferably semi-permanent or permanent in nature. "Semi-permanent" as used here means that the change, such as the color change, persists at least 24 hours or more preferably 72 hours, and "permanent" as used here means that the change persists essentially indefinitely. This approach is to be contrasted with triboluminescence, wherein an impact causes light to be emitted as a flash, but the intensity falls rapidly. In that case, there must be some method of detecting and recording the light emission, such as a piece of photographic film or a light detector instrument, present at about the time the light emission occurs. Such approaches may be useful for laboratory testing, but they are not feasible in most cases for manufacturing or service applications. In the present approach, the semi-permanent or permanent visible changes, such as the color changes, permit the fact of the impact to be viewed for a period of time after the impact has occurred, without the need for special light-gathering instrumentation present at the time the impact occurs. The present approach may be combined with a triboluminescent approach, so that there is both a color change and light produced responsive to the impact, but the triboluminescent approach may not be used solely and by itself in the present invention.

The flowable indicator paint is applied to the surface of the low-ductility material, step 54 of FIG. 3. The application 54 of the flowable indicator paint may be performed by any operable approach, such as spraying, brushing, screen printing, electrostatic deposition, or the like. The viscosity of the flowable paint is adjusted by changing the amount of the carrier according to the flowability requirements of the selected application technique. After application, the indicator paint is typically cured by the process recommended for the paint base. In many cases, the curing is accomplished by air drying at room temperature, although indicator-paint formulations requiring curing at elevated temperature may be used. The result in the preferred approach is microcapsules of the first reactant bound in a matrix comprising the paint binder and the second reactant. The solid layer of the indicator paint 36 is typically from about 0.001 to about 0.0035 inches thick after drying and curing, although thicker and thinner layers are operable.

The low-ductility material having the indicator paint thereon is placed into circumstances where it may be subject to the mechanical impact, step 56. These circumstances are typically during manufacturing operations, during testing, and during service. It is preferred that the low-ductility material having the paint thereon not be instrumented with light-detection instrumentation or photographic recording film, for the reasons discussed above. During this step 56, there may be impacts on the painted article. These impacts may be high-rate-of-application impacts, such as the impact of a propelled rock or the impact of a dropped tool that falls onto the aircraft skin. These impacts may instead be low-rate-of-application impacts, such as the slow forcing of a tool into the surface of the aircraft skin.

The low-ductility material 34 having the indicator paint layer 36 thereon is thereafter inspected for the presence of the visible change, step 58. The initial inspection is preferably performed by a visual inspection with the unaided eye, where the visible change is viewable in the visible-wavelength spectrum. The inspection by unaided eye may be followed by inspection using instrumentation sensitive to the visible change, such as a color-sensitive photometer. The use of instrumentation during this inspection step 58 is distinct from the preferred non-use of instrumentation during the exposure or placing step 56. The placing step 56 is often performed during manufacturing operations or in service, as by flying the aircraft 20, where it is not practical to use instrumentation that covers large surfaces of the aircraft. The inspection step 58, on the other hand, is typically performed at a location where it is feasible to use instrumentation, such as at an airport where the aircraft is to be preflight inspected prior to its next flight or at a maintenance facility.

FIG. 4 is a schematic enlargement of the paint panel 32 of FIG. 2, illustrating the results of an impact. An impactor 70 impacts upon the surface 38 of the panel 32, with the layer of the indicator paint 36 between the impactor 70 and the surface 38. The layer of the indicator paint 36 comprises microcapsules 80 of the first reactant and a matrix 82 in the which microcapsules are embedded. The matrix 82 comprises the paint binder and the second reactant. The impact causes the rupturable barriers (i.e., the walls of the microcapsules 80) under the impactor 70 to rupture, producing a colored region 72 as the reactants react together. This colored region 72 marks the location of an underlying impact-affected region 74 (if such has occurred) of the low-ductility material 34. After this impact-affected region 74 is investigated further, a new indicator paint layer 36 may be applied over the colored region 72, so that the surface is again viewed in the original color.

In one typical application of the present approach, the indicator paint is applied to the surface of a subcomponent of a structure made of the low-ductility material, during the early stages of the manufacturing process. If any impacts occur during the later stages of the manufacturing process, they will be visible in the indicator paint. Such impacts typically occur accidentally, for example because the subcomponent is dropped. The low-ductility material 34 underlying each colored region 72 of the indicator paint is investigated to determine whether the color changes relate to a minor impact or a more-severe impact that causes damage, such as the impact-affected region 74. If the latter, the damage to the subcomponent may be repaired.

In another application of the present approach, the indicator paint is applied to portions of the structure of the aircraft 20. The aircraft then is flown in service, and possibly impacted by an object. Prior to the next flight, the aircraft crew performs a walk-around inspection of the aircraft. If the crew sees the visible change, such as the color change 72, it is alerted to the possible presence of the affected region 74. This is not to say that the presence of the colored region 72 and the affected region 74 necessarily suggests the presence of substantial damage to the low-ductility material, only that the region 74 has been affected by a surface-applied loading such as a possible impact, and should be investigated further. After the investigation, the colored region 72 may again be repainted back to its original color, or it may be left with the visible colored region 72.

The present approach may be limited to the detection and indication of impacts, as just described for steps 50-58. It may also be optionally extended to the determination of design standards for the low-ductility material, step 60 of FIG. 3. Some background is helpful to understand the approach for setting the design standards for such low-ductility materials. The effect of an impact on a low-ductility material, such as a composite material, varies according to the magnitude of the impact. Very low impacts (e.g., a coin dropped on the surface) have substantially no effect on the low-ductility material. Moderate impacts (e.g., a tool dropped on the surface) may cause subsurface damage that is not visible on the surface. High-magnitude impacts (e.g., a cart running into the surface) produce both visible and subsurface damage. The dividing line between the moderate-impact damage and the high-magnitude-impact damage, when damage is first being manifested by visible surface changes, is considered as "barely visible impact damage".

The effect of moderate impacts is of great concern to those who build structures from these materials. The subsurface damage that is not immediately visible on the surface may subsequently propagate to produce failure of the low-ductility material. Thus, a tool dropped onto a composite structure may leave no visible signs of damage, but the subsurface damage that is sustained in the impact may later produce a failure originating in that area. By contrast, ductile metallic materials normally show a surface indication of such an impact event, in the form of a dent which alerts later observers to the possible damage and leads to an inspection.

In the normal practice for critical structures such as aircraft, all materials are assigned a safety factor in the setting of design standards. For example, materials used in aircraft structures may be assigned a safety factor of 1.5. Under this safety-factor practice, a material having a measured tensile strength of 45,000 pounds per square inch (psi) is assigned a maximum design strength of 30,000 psi (i.e., 45,000/1.5). This is the strength level that aircraft designers are allowed to use for this higher-ductility material.

In recognition of the possibility of medium-level non-visible damage, the industry uses additional standards procedures by which the maximum design strength of a low-ductility material is further reduced by the damage-tolerance factor. In the example of the preceding paragraph, if the damage-tolerance factor is a further reduction factor of 2.0, then the maximum allowable design strength of the low-ductility material becomes 30,000 psi/2.0 or 15,000 psi, even where the actual measured strength of the material is 45,000 psi. That is, in this example the maximum allowable design strength is one-third of the actual measured strength. The result is that a larger thickness and weight of the low-ductility material must be used than would otherwise be the case, and the structure is heavier than would otherwise be the case, as a result of the possibility of non-visible impact damage. Consequently, the weight-reduction potential advantages otherwise available through the use of low-ductility materials such as organic-matrix composite materials is significantly reduced.

The present approach provides a technique by which the damage-tolerance factor that is applied to low-ductility materials (the 2.0 factor in the above example) may be reduced or eliminated. By making the possibility of low-level and medium-level damage visible to the naked eye, the indicator paint of the present approach provides the analogous condition in a low-ductility material to a dent that is observable in the surface of a higher-ductility material. Those responsible for detecting and repairing damage to the low-ductility material are provided a visible indicator of the possible damage and its location, which is then followed up by an inspection technique (e.g., X-ray or acoustic inspections) that is designed to detect whether there actually is subsurface damage. If there is, that damage may be repaired and the area repainted with the indicator paint. If there is not any such subsurface damage, as where there is a visible indication of impact but the impact was in fact of too low a magnitude to cause subsurface damage, the visible indication is "erased" by repainting the area that had the visible indication. This repainting restores the original appearance of the surface, and readies the surface for subsequent use.

Because the potential subsurface impact damage is indicated by the presence of the visible change of the indicator paint, there is no longer a need to apply a further damage-tolerance factor to the design standards of the low-ductility materials. It is necessary only to apply the same safety factor that is applied to higher-ductility materials, thus reducing the penalty in the form of the damage-tolerance factor otherwise applied to the low-ductility materials. However, there may be a preference to retain some non-unity damage-tolerance factor for use with the low-ductility materials, but the damage-tolerance factor may be reduced. In the example above, the damage-tolerance factor applied to the low-ductility materials is preferably reduced from 2.0 to 1.0 (i.e., no damage-tolerance factor reduction), or in some cases to an intermediate value between 2 and 1, such as 1.2. Even with a reduced damage-tolerance factor rather than eliminating the damage-tolerance factor (i.e., making it 1.0), the potential weight savings resulting from the use of the low-ductility materials is significantly improved.

The indicator paint may be used in a variety of circumstances. When a low-ductility subcomponent is first manufactured, it may be coated with the indicator paint at this early stage of the manufacturing process. Any impacts that thereafter unintentionally occur during the manufacturing process may be readily detected, and the resulting damage repaired where necessary. After the low-ductility assembly is prepared from the subcomponents, either the indicator paint that was already in place from the manufacturing operation is left in place, or the assembly is painted with the indicator paint. Any impacts that thereafter occur during service or subsequent maintenance or testing may be readily detected. The indicator paint is preferably applied to internal surfaces as well as external surfaces of the structure, because damage may occur from internal sources, such as an accidental impact to an internal surface during a maintenance procedure, or where something on the inside of the structure becomes loose and impacts on the low-ductility structure.

In the ideal case, the visible change to the indicator paint occurs at an impact level that does not cause damage to the underlying material. Thus no allowance is needed in design limits for damage which has occurred but is not detectable. In the case where damage does occur before color change (e.g., a thin structure), that level of damage can be determined and factored into the design limits.

The impact level at which the indicator paint exhibits the visible indication of impact may be controlled. For example, the strength of the walls of the microcapsules that contain the first reactant (or the sole color-producing agent) may be varied, or the size of the microcapsules may be varied. Techniques for controlling the rupturability of microcapsules are known in the art for use in other applications. The indicator paint may contain more than one type of reagent set, contained in more than one type of microcapsule. For example, a first-type of first reactant may be contained in a first type of microcapsule having a first level of rupturability, and a second-type of first reactant may be contained in a second type of microcapsule having a second level of rupturability. The paint binder matrix contains a single type of second reactant that reacts with the first-type of first reactant to produce a first color, and the second-type of second reactant to produce a second color. The relative magnitude of an impact is indicated by the absence of color, or the color shade at the impact site.

The indicator paint is a tool that is used in addition to subsurface inspection techniques such as X-ray and ultrasound inspection, and does not replace these approaches. It is not practical to inspect an entire aircraft by X-ray and ultrasound at each stage of manufacture, after each maintenance procedure, or after each flight. The indicator paint provides a readily visible, surface indicator of the possible occurrence of damage, which is then followed up by the use of the subsurface inspection techniques such as X-ray and ultrasound.

The present approach has been reduced to practice using color-producing reactants supplied by the Appleton Company, which were mixed into a commercial white latex house paint. The resulting indicator paint was applied to the surface of a graphite-epoxy composite panel by spraying and allowed to dry and cure in air. A number of different mechanical impacts were produced by dropping objects onto the surface of the painted panel from various heights. Examples of such objects include 1 inch diameter steel balls and various types of tools. The indicator paint turned blue at the point of the mechanical impact in each case. It is expected that optimization of the indicator material and the paint base will allow more refined observations of the effects of such mechanical impacts.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A method of identifying subsurface damage to a composite material aircraft caused by a mechanical impact, comprising the steps of:
   providing a plurality of panels made from a low ductility composite material, with each panel having a surface wherein the low ductility of the material is characterized by a tensile elongation to failure of less than about 2 percent;
   preparing an indicator paint having an impact-sensitive component that produces a visible change when subjected to a mechanical impact, wherein the indicator paint comprises a mixture of a first reactant and a second reactant separated by a barrier that is rupturable so that the first reactant and the second reactant mix and produce the visible change when the indicator paint is subjected to the impact;
   covering the surface of each panel with the indicator paint wherein each panel is mounted on a support structure to substantially maintain a form for the panel;
   visually inspecting each supported panel periodically to locate the visible change indicative of a panel deformation caused by the mechanical impact; and
   in response to locating the visible change on a respective panel, evaluating the respective panel to identify any subsurface damage.

2. The method of claim 1 wherein the evaluating step is accomplished by performing an X-ray inspection of the respective panel.

3. The method of claim 1 wherein the evaluating step is accomplished by performing an acoustic inspection of the respective panel.

4. The method of claim 1 wherein the panels are assembled to form the aircraft after the covering step.

5. The method of claim 1 wherein the indicator paint does not emit light when subjected to the mechanical impact.

6. The method of claim 1 wherein the step of inspecting is performed without light-detection instrumentation.

7. The method of claim 1 wherein the step of inspecting is performed by an unaided eye.

8. The method of claim 1 further comprising the step of determining a design limit for the composite material responsive to an observability of impact indications.

9. The method of claim 1 further comprising the step of determining a first design limit for the composite material with indicator paint applied thereto, and a second design limit for the composite material with no indicator paint applied thereto.

10. A method of identifying subsurface damage to a composite material aircraft caused by a mechanical impact, comprising the steps of:
    providing a plurality of panels made from a low ductility composite material, with each panel having a surface, wherein the low ductility of the composite material is characterized by a tensile elongation to failure of less than about 2 percent;
    preparing an indicator paint having an impact-sensitive component that changes color when subjected to a mechanical impact, wherein the indicator paint comprises a mixture of
    a first reactant, and
    a second reactant,
    wherein the first reactant and the second reactant are separated by a barrier that is ruptured when the indicator paint is subjected to the mechanical impact;
    covering the surface of each panel with the indicator paint wherein each panel is mounted on a support structure to substantially maintain a form for the panel;
    visually inspecting each supported panel periodically to locate a color change indicative of a panel deformation caused by the mechanical impact; and
    in response to locating the color change on a respective panel, evaluating the respective panel to identify any subsurface damage.

11. The method of claim 10 wherein the indicator paint does not emit light when subjected to the mechanical impact.

12. The method of claim 10 wherein the step of inspecting is performed without light-detection instrumentation.

13. The method of claim 10, wherein the step of inspecting is performed by an unaided eye.

14. The method of claim 10 further comprising the step of determining a design limit for the composite material responsive to an observability of impact indications.

15. The method of claim 10 further comprising the step of determining a first design limit for the composite material with the indicator paint applied thereto, and a second design limit for the composite material with no indicator paint applied thereto.

16. The method of claim 10 wherein the composite material is a polymer-matrix composite material.

* * * * *